UNITED STATES PATENT OFFICE 2,158,021

VULCANIZATION OF RUBBER

Joy G. Lichty, Stow, Ohio, assignor to Wingfoot Corporation, Wilmington, Del., a corporation of Delaware No Drawing. Application February 23, 1935, Serial No. 7,835

11 Claims. (Cl. 18—53)

This invention relates to a new class of compounds, the members of which are valuable in the vulcanization of rubber. It relates, among other things, to a method of accelerating the processes of vulcanization by incorporating in the vulcanized stock certain chemical compounds which not only are comparatively easy to prepare but also impart desirable physical properties to the vulcanized products. The compounds with which the invention deals are new in themselves and may be described as substituted ammonium carboxy alkyl sulphides derived from 1-mercaptothiazoles.

Mercaptobenzothiazole and various derivatives thereof have been known heretofore to accelerate the vulcanization of rubber. For instance, in United States Patent No. 1,784,498 to Scott, there is described the use in rubber of the reaction products of dichlor acetic acid and mercaptobenzothiazole. The patent also discloses the alkyl esters thereof. Such compounds, while good accelerators, are not as strong as the substituted ammonium carboxy alkyl di(benzothiazyl 1-sulphides) of the present invention which may be employed either by themselves or in conjunction with a basic accelerator. The substituted ammonium carboxy alkyl mono (benzothiazyl 1-sulphides) of this invention are more powerful than other carboxyl alkyl mono (benzothiazyl 1-sulphides) but generally require the presence of a basic accelerator to give effective acceleration.

Illustrative of the compounds which the invention concerns is the type formula $$(T-S)_n-R-\overset{O}{\underset{\|}{C}}-O-X$$

wherein T is a 1-thiazyl radical, $n$ is one or two, R is an alkyl group and X is a substituted ammonium radical. X may be any substituted ammonium group such as

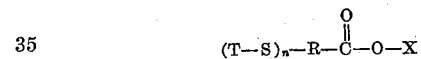

etc. The compounds may be prepared by reacting a 1-mercaptothiazole, preferably an alkali metal salt thereof, with a substituted ammonium salt of a mono- or dihalogenated fatty acid. An alternative procedure is to react an alkali metal or other water soluble salt of a 1-mercaptothiazole with the sodium or other water soluble salt of the mono or dihalogenated fatty acid, subsequently acidifying the product and then reacting it with the desired amine. In certain cases the products form at once. In others, it may be necessary to heat the mixture for a short period of time or, in the alternative, to allow it to stand for several hours. Usually it is preferable to prepare the products in solution. The solvent may be any which is suitable, generally water or alcohol being desirable. Any water soluble metallic salt of the reactants other than the sodium salts may be used, the calcium salts being exemplary.

Where the halogenated fatty acid employed is acetic acid, R in the above formula is methyl; similarly, where butyric acid, for instance, is employed, R is a propyl group. Generally, the halogen atoms attach most easily to the carbon atom alpha to the carbonyl group of the fatty acid and, thus, the mercaptan sulphur atom of the mercaptothiazole will be separated from the carbonyl group of the fatty acid by a single carbon atom. When the compounds are to be employed as accelerators of vulcanization, such products will generally be found preferable to those in which the carbonyl group is separated from the mercaptothiazole radical by more than one carbon atom, although it will be understood that the invention is not limited thereto. A formula illustrating the preferable compounds of the invention is the following:

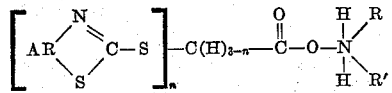

wherein AR represents an ortho arylene radical of the benzene and naphthalene series, $n$ is one or two, R is an aliphatic radical and R' is hydrogen or aliphatic or with R forms an alkylene chain.

Illustrating the preparation of these compounds is that of piperidinium carboxy methyl benzothiazyl 1-sulphide. This compound is prepared by suspending 45 grams of carboxy methyl benzothiazyl 1-sulphide in a solution of 18.7 grams of piperidine in 50 cc. of ether. The mixture is then triturated, filtered and the product washed with ether. The product, piperidinium carboxy methyl benzothiazyl 1-sulphide, melts at 126–127° C. and is obtained in an almost quantitative yield. The reaction proceeds as follows:

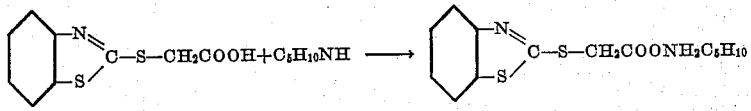

Ethylene di(ammonium oxy carbonyl methyl benzothiazyl 1-sulphide) is prepared similarly by adding slowly with stirring 12.5 grams of 95.8% ethylene diamine to a suspension of 90 grams of carboxy methyl benzothiazyl 1-sulphide in 400 cc. of methyl alcohol. A precipitate forms which, upon being filtered and recrystallized from water, melts at 189–190° C. The reaction proceeds as follows:

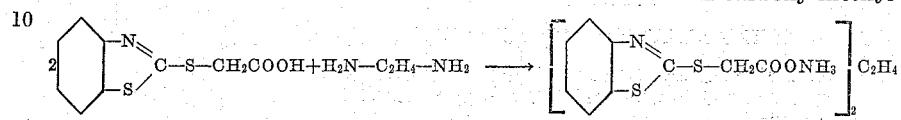

The diphenylguanidine salt of carboxy methyl benzothiazyl 1-sulphide is prepared by warming a mixture of 42.2 grams of diphenylguanidine, 45.0 grams of carboxy methyl benzothiazyl 1-sulphide and 100 cc. of methyl alcohol. A brown precipitate forms. The alcohol is then removed by evaporation in the air and the precipitate is dried in a vacuum desiccator over sulphuric acid. The product, the diphenylguanidine salt of carboxy methyl benzothiazyl 1-sulphide, is in the form of a light brown solid and is obtained in an almost quantitative yield. The reaction is as follows:

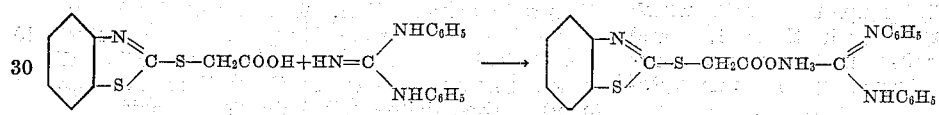

The cyclohexyl amine salt of carboxy methyl benzothiazyl 1-sulphide is prepared by adding 55 grams of cyclohexyl amine to a suspension of 112.5 grams of carboxy methyl benzothiazyl sulphide in 300 cc. of methyl alcohol. An exothermic reaction takes place, the resulting salt going into solution and separating out on cooling. The resulting solid, when filtered off and dried, melts at 182° C. and weighs 147.3 grams. The equation representing the reaction is as follows:

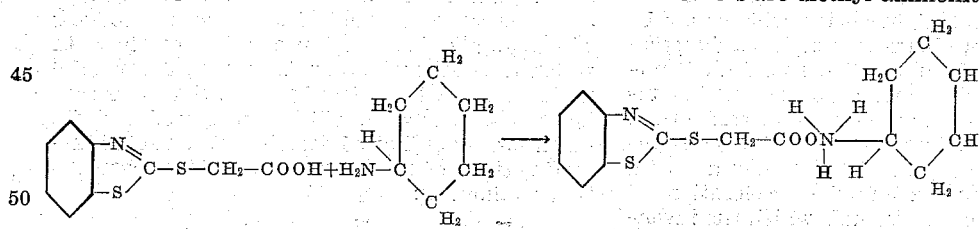

Substituted ammonium salts of carboxy alkyl di(thiazyl 1-sulphides) may be prepared similarly by reacting the desired amine with the carboxy alkyl di(benzothiazyl 1-sulphide) or by reacting a substituted ammonium salt of the dihalogenated fatty acid with the desired mercaptothiazole, preferably an alkali metal salt thereof. Thus, the dibutyl amine salt of carboxy methyl di(benzothiazyl 1-sulphide) may be prepared by adding dibutyl amine to a suspension of carboxy methyl di(benzothiazyl 1-sulphide) in methyl alcohol. The resulting product may be separated as described above. The reaction is as follows:

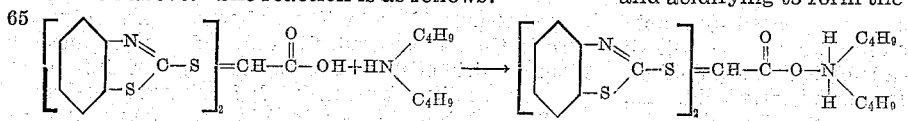

The carboxy methyl di(benzothiazyl 1-sulphide) is conveniently prepared by reacting the sodium salt of mercaptobenzothiazole with the sodium salt of dichlor acetic acid and thereafter acidifying the product.

Other compounds of the invention are piperidinium carboxy methyl di(benzothiazyl 1-sulphide), morpholinium carboxy methyl di(benzothiazyl 1-sulphide), methyl ammonium carboxy methyl benzothiazyl 1-sulphide, morpholinium carboxy methyl benzothiazyl 1-sulphide, di isopropyl ammonium carboxy methyl di(benzothiazyl 1-sulphide), iso amyl ammonium carboxy methyl benzothiazyl 1-sulphide, dicyclohexyl ammonium carboxy methyl benzothiazyl 1-sulphide, dicyclohexyl ammonium carboxy methyl di(benzothiazyl 1-sulphide), phenyl ammonium carboxy methyl di(benzothiazyl 1-sulphide), benzyl ammonium carboxy methyl di(benzothiazyl 1-sulphide), beta phenyl ethylene ammonium carboxy methyl di(benzothiazyl 1-sulphide), tetrahydro alpha furfuryl ammonium carboxy methyl benzothiazyl 1-sulphide, tetrahydro alpha furfuryl ammonium carboxy methyl di(benzothiazyl 1-sulphide), ditetrahydro alpha furfuryl ammonium carboxy methyl di(benzothiazyl 1-sulphide) and ditetrahydro alpha furfuryl ammonium carboxy methyl benzothiazyl 1-sulphide. Others are the paraphenylene diamine salt of carboxy methyl benzothiazyl 1-sulphide, the para phenylene diamine salt of carboxy methyl di(benzothiazyl 1-sulphide), the diphenylguanidine salt of carboxy methyl di(benzothiazyl 1-sulphide), dibenzyl ammonium carboxy methyl benzothiazyl 1-sulphide, and furfuryl ammonium carboxy methyl di(benzothiazyl 1-sulphide). Still others are diethyl ammonium alpha carboxy

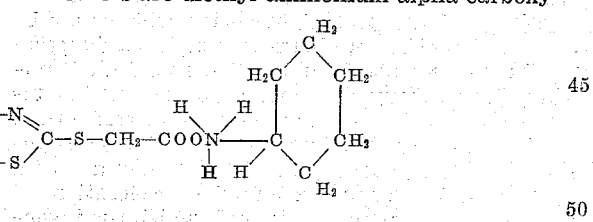

propyl benzothiazyl 1-sulphide, piperidinium ammonium alpha carboxy propyl benzothiazyl 1-sulphide, cyclohexyl ammonium alpha carboxy propyl benzothiazyl 1-sulphide, and butyl ammonium alpha carboxy propyl benzothiazyl 1-sulphide. One method of preparing these latter materials is to react the amine with alpha carboxy propyl benzothiazyl 1-sulphide which is prepared by dissolving in water one mol of the sodium salt of alpha brom butyric acid and mixing the resulting solution with an aqueous solution of one mol of the sodium salt of 1-mercaptobenzothiazole and acidifying to form the free acid. The formula of alpha carboxy propyl benzothiazyl 1-sulphide is believed to be as follows:

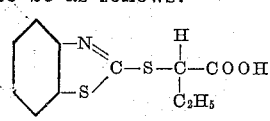

It will of course be understood that any other mercapto thiazole may be employed in the practice of the invention, examples being 1-mercapto alpha naphthathiazole, 1-mercapto beta naphthathiazole, 1-mercapto 4-nitro benzothiazole, 1-mercapto 5-nitro benzothiazole, 1-mercapto 4-chlor benzothiazole, 1-mercapto 5-chlor benzothiazole, 1-mercapto 3-phenyl benzothiazole, 1-mercaptothiazole, 1-mercapto 3-phenyl thiazole, 1-mercapto 3-methyl thiazole, 1-mercapto 3-methyl benzothiazole, the 1-mercapto tolyl thiazoles, the 1-mercapto xylyl thiazoles, 1-mercapto 5-amino benzothiazoles, 1-mercapto 5-ethoxy benzothiazole, 1-mercapto 5-methoxy benzothiazole and other halogen-, nitro-, hydroxy-, alkoxy-, and amino-substituted arylene mercaptothiazoles.

The compounds to which the invention relates may be employed as accelerators of vulcanization in substantially any of the standard rubber formulae, one found satisfactory being the following:

| | Parts by weight |
|---|---|
| Extracted pale crepe rubber | 100 |
| Zinc oxide | 5 |
| Sulphur | 3 |
| Stearic acid | 1.5 |
| Accelerator | As indicated |

After vulcanization, physical tests on illustrative stocks so made up were run with the following results:

| Cure, time in mins. °F. | Ult. tens. kgs/cm.² | Max. elong. in percent | Modulus kgs/cm.² at— | |
|---|---|---|---|---|
| | | | 500% | 700% |

*Ethylene diamine salt of carboxy methyl benzothiazyl 1-sulphide, 0.5 part; diphenylguanidine, 0.2 part*

| 40/260 | 28 | 970 | 5 | 13 |
| 60 | 65 | 960 | 8 | 17 |
| 80 | 52 | 775 | 13 | 35 |
| 120 | 98 | 875 | 14 | 37 |

*Diphenylguanidine salt of carboxy methyl benzothiazyl 1-sulphide, 0.5 part; diphenylguanidine, 0.2 part*

| 40/260 | 23 | 965 | 4 | 7 |
| 60 | 57 | 965 | 7 | 14 |
| 90 | 77 | 895 | 10 | 26 |
| 120 | 73 | 795 | 12 | 36 |

*Piperidinium carboxy methyl benzothiazyl 1-sulphide, 0.5 part; diphenyl guanidine, 0.2 part*

| 45/260 | 40 | 975 | 5 | 10 |
| 60 | 67 | 965 | 8 | 18 |
| 90 | 90 | 885 | 12 | 32 |
| 120 | 130 | 880 | 15 | 46 |

These compounds, new in themselves, possess valuable properties as accelerators of vulcanization. The substituted ammonium carboxy alkyl di(thiazyl 1-sulphides) may be employed either by themselves or in conjunction with other basic nitrogen-containing accelerators such as diphenylguanidine, diortho tolyl guanidine, diphenylguanidine oxalate, diphenylguanidine succinate, cyclohexyl ammonium fumarate, the accelerating aldehyde-amines, the poly ethylene poly amines, and the like. In general, the substituted ammonium salts of the dihalogen fatty acid derivatives of the mercaptothiazoles are more powerful accelerators than the substituted ammonium salts of the mono halogen derivatives. Consequently, with the dihalogen derivatives, activators will not usually be necessary, although they may be found desirable in certain instances. With the mono halogen derivatives, on the other hand, activators are in most cases desirable.

It is intended that the patent shall cover, by suitable expression in the appended claims, whatever features of patentable novelty reside in the invention.

What I claim is:

1. The process which comprises vulcanizing a vulcanizable rubber composition in the presence of piperidinium carboxymethyl benzothiazyl 1-sulphide having the formula

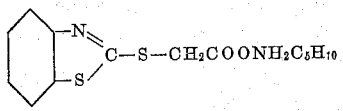

2. The process which comprises vulcanizing a vulcanizable rubber composition in the presence of diphenylguanidine and an aliphatic amine salt of carboxymethyl benzothiazyl 1-sulphide, the free acid having the formula

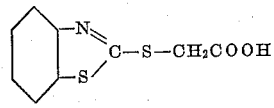

3. The process which comprises vulcanizing a vulcanizable rubber composition in the presence of a basic nitrogen-containing accelerator and a primary amine salt of carboxymethyl benzothiazyl 1-sulphide, the free acid having the formula

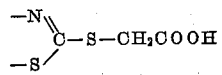

4. The process which comprises vulcanizing a vulcanizable rubber composition in the presence of a compound of the formula

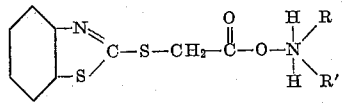

wherein R and R' are aliphatic radicals.

5. The process which comprises vulcanizing a vulcanizable rubber composition in the presence of a basic nitrogen-containing accelerator and a compound of the formula

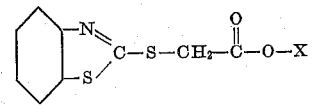

wherein X is an organic ammonium radical connected through the nitrogen.

6. The process which comprises vulcanizing a vulcanizable rubber composition in the presence of a basic nitrogen-containing accelerator and a compound of the formula

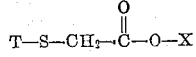

wherein T is a 1-thiazyl radical and X is binary ammonium group connected through the nitrogen.

7. The process which comprises vulcanizing a vulcanizable rubber composition in the presence of a basic nitrogen-containing accelerator and diphenyl guanidine carboxymethyl benzothiazyl 1-sulphide having the formula.

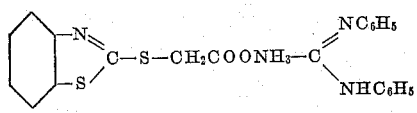

8. The process which comprises vulcanizing a vulcanizable rubber composition in the presence of a basic nitrogen-containing accelerator and the ethylene diamine salt of carboxymethyl benzothiazyl 1-sulphide having the formula.

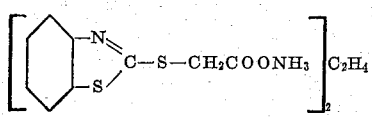

9. A rubber product which has been vulcanized in the presence of a basic nitrogen-containing accelerator and a secondary amine salt of carboxymethyl benzothiazyl 1-sulphide, the free acid having the formula

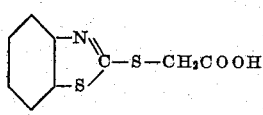

10. The process which comprises vulcanizing a vulcanizable rubber composition in the presence of an amine salt of acetic acid in which only one hydrogen atom of the methyl group linked to the CO is replaced by a benzothiazyl 1-thio radical.

11. A process which comprises vulcanizing a vulcanizable rubber composition in the presence of a basic nitrogen-containing accelerator and an amine salt of acetic acid in which only one hydrogen atom of the methyl group linked to the CO is replaced by an arylene thiazyl 1-thio radical and in which one of the other two hydrogen atoms of the methyl group linked to the CO may be replaced by an alkyl group, said amines being selected from the group consisting of the primary and secondary aliphatic amines, the primary and secondary alicyclic amines, the primary aromatic amines, the primary and secondary aralkyl amines and the primary and secondary furfuryl and tetrahydro furfuryl amines.

JOY G. LICHTY.

Certificate of Correction

Patent No. 2,158,021. May 9, 1939.

JOY G. LICHTY

It is hereby certified that errors appear in the printed specification of the above numbered patent requiring correction as follows: Page 1, first column, line 5-6, for the word "vulcanized" read *unvulcanized*; page 3, second column, lines 32 to 35 inclusive, claim 3, strike out the formula and insert instead the following—

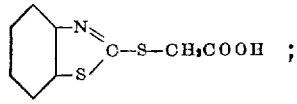

line 68, claim 7, for "guanidine" read *guanidinium*; and that the said Letters Patent should be read with these corrections therein that the same may conform to the record of the case in the Patent Office.

Signed and sealed this 1st day of August, A. D. 1939.

[SEAL]

HENRY VAN ARSDALE,
*Acting Commissioner of Patents.*